US008341459B2

(12) United States Patent
Kaushik et al.

(10) Patent No.: US 8,341,459 B2
(45) Date of Patent: Dec. 25, 2012

(54) DATA MIGRATION WITHOUT INTERRUPTING HOST ACCESS AND WITH DATA LOCK FOR WRITE ACCESS REQUESTS SUCH THAT HELD WRITE ACCESS REQUESTS DO NOT EXPIRE

(75) Inventors: Balakumar Kaushik, Bangalore (IN); Deepak Hegde, Bangalore (IN); Anil Kumar, Bangalore (IN); Narasimha Murthy, Bangalore (IN)

(73) Assignee: Brocade Communications Systems, Inc., San Jose, CA (US)

( * ) Notice: Subject to any disclaimer, the term of this patent is extended or adjusted under 35 U.S.C. 154(b) by 887 days.

(21) Appl. No.: 12/183,581

(22) Filed: Jul. 31, 2008

(65) Prior Publication Data

US 2009/0037679 A1 Feb. 5, 2009

Related U.S. Application Data

(60) Provisional application No. 60/953,371, filed on Aug. 1, 2007.

(51) Int. Cl.
*G06F 13/00* (2006.01)

(52) U.S. Cl. ......... 714/6.3; 710/200; 711/162; 711/158; 709/232; 709/238

(58) Field of Classification Search ............... 714/7, 6.3; 710/36, 200; 711/162, 158; 709/217, 232, 709/238
See application file for complete search history.

(56) References Cited

U.S. PATENT DOCUMENTS

| 5,623,669 A * | 4/1997 | Kincaid ................. 1/1 |
| 5,915,025 A | 6/1999 | Taguchi et al. |
| 5,940,508 A | 8/1999 | Long et al. |
| 7,110,546 B2 | 9/2006 | Staring |
| 7,165,158 B1 * | 1/2007 | Yagawa .................. 711/165 |
| 7,490,248 B1 | 2/2009 | Valfridsson et al. |
| 7,546,482 B2 * | 6/2009 | Blumenau et al. ........... 714/5.11 |
| 7,559,088 B2 | 7/2009 | Cohen et al. |
| 8,010,809 B1 | 8/2011 | Shah |
| 2002/0126849 A1 | 9/2002 | Howard et al. |
| 2002/0138747 A1 | 9/2002 | Clarke |
| 2004/0153616 A1 * | 8/2004 | Nakamura et al. ........... 711/162 |
| 2005/0033828 A1 * | 2/2005 | Watanabe .................. 709/219 |
| 2007/0058801 A1 | 3/2007 | Plotkin et al. |
| 2007/0094466 A1 * | 4/2007 | Sharma et al. ............... 711/162 |
| 2007/0130432 A1 * | 6/2007 | Aigo ........................... 711/162 |
| 2007/0220312 A1 * | 9/2007 | Boyd et al. .................. 714/6 |
| 2007/0245104 A1 * | 10/2007 | Lindemann et al. ......... 711/162 |
| 2008/0229118 A1 | 9/2008 | Kasako et al. |
| 2008/0240434 A1 | 10/2008 | Kitamura |
| 2008/0319909 A1 | 12/2008 | Perkins et al. |
| 2009/0041249 A1 | 2/2009 | Tanaka et al. |

OTHER PUBLICATIONS

Office Action Dated Dec. 7, 2011 for U.S. Appl. No. 12/615,408.
Office Action Dated Nov. 2, 2011 for U.S. Appl. No. 12/542,438.
Response to Office Action Dated Nov. 2, 2011 for U.S. Appl. No. 12/542,438.

* cited by examiner

*Primary Examiner* — Hong Kim
(74) *Attorney, Agent, or Firm* — Conley Rose, P.C.

(57) ABSTRACT

A system includes a source storage device, a target storage device, a host coupled to the source storage device and the target storage device, and a first migration device coupled to the source storage device and the target storage device. The first migration device includes a first virtual storage device. The first migration device is configured to migrate data from the source storage device to the target storage device, and the first virtual storage device is configured to receive write access requests for the data from the host during the data migration and send the access request to the source storage device and target storage device.

17 Claims, 3 Drawing Sheets

DATA MIGRATION WITHOUT INTERRUPTING HOST ACCESS AND WITH DATA LOCK FOR WRITE ACCESS REQUESTS SUCH THAT HELD WRITE ACCESS REQUESTS DO NOT EXPIRE

CROSS-REFERENCE TO RELATED APPLICATIONS

This application claims priority to U.S. Provisional Application Ser. No. 60/953,371 titled "Data Migration Without Interrupting Host Access," filed Aug. 1, 2007, incorporated herein by reference.

BACKGROUND

Data migration between storage devices may be necessary for a variety of reasons. For example, storage devices are frequently replaced because users need more capacity or performance. Additionally, it may be necessary to migrate data residing on older storage devices to newer storage devices. In "host-based" data migration, host CPU bandwidth and host input/output ("I/O") bandwidth are consumed for the migration at the expense of other host application, processing, and I/O requirements. Also, the data marked for migration is unavailable for access by the host during the migration process. Finally, the migration application and updates must be installed on each of possibly many hosts, which presents administrative and stability problems.

SUMMARY

Systems, devices, and methods to overcome these and other obstacles to data migration are described herein. A system includes a source storage device, a target storage device, a host coupled to the source storage device and the target storage device, and a first migration device coupled to the source storage device and the target storage device. The first migration device includes a first virtual storage device, and the first migration device migrates data from the source storage device to the target storage device. The first virtual storage device receives write access requests for the data from the host during the data migration, and sends the write access requests to the source storage device and target storage device.

A device includes a first virtual storage device and an alternate virtual storage device. The first virtual storage device fails over to the alternate virtual storage device upon an error. The device migrates data from a source storage device to a target storage device. The first virtual storage device receives write access requests for the data from the host during the data migration, and sends the write access requests to the source storage device and the target storage device.

A method of migrating data includes creating a first virtual storage device. The method further includes copying the data from a source storage device to a target storage device using the first virtual storage device. The method further includes receiving write access requests for the data at the first virtual storage device from a host during migration, and sending the write access requests from the first virtual storage device to the source storage device and the target storage device.

A computer-readable medium stores a software program that, when executed by a processor, causes the processor to create a first virtual storage device. The processor is further caused to copy data from a source storage device to a target storage device using the first virtual storage device. The processor is further caused to receive write access requests for the data at the first virtual storage device from a host during migration of the data and send the write access requests from the first virtual storage device to the source storage device and the target storage device.

These and other features and advantages will be more clearly understood from the following detailed description taken in conjunction with the accompanying drawings and claims.

BRIEF DESCRIPTION OF THE DRAWINGS

For a more complete understanding of the present disclosure, reference is now made to the accompanying drawings and detailed description, wherein like reference numerals represent like parts.

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer a combination of network elements.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1A:
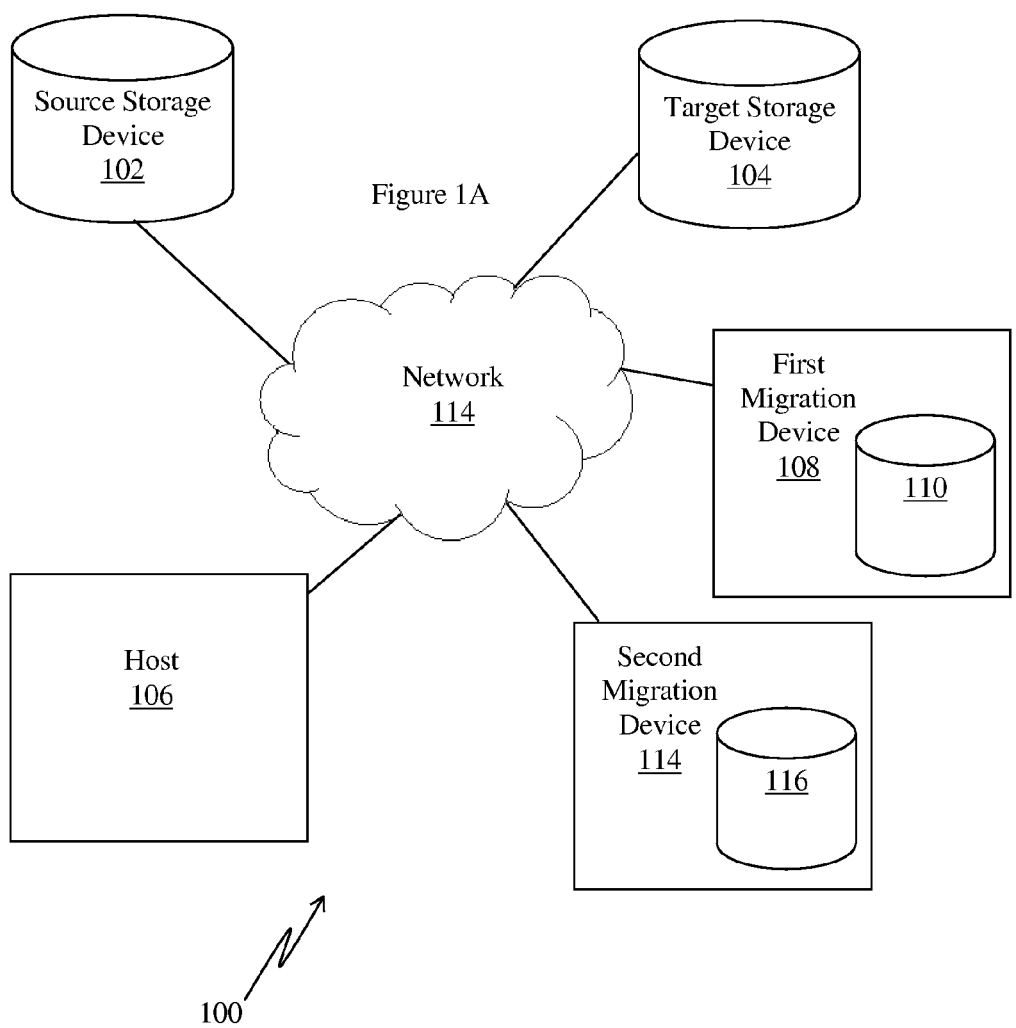
FIG. 1A illustrates a system for migrating data constructed in accordance with at least some illustrative embodiments.

FIG. 1A illustrates a system 100 including a source storage device 102, a target storage device 104, a host 106, and a first migration device 108. In at least one embodiment, the first migration device is a switch. The source storage device 102, the target storage device 104, the host 106, and the first migration device 108 are coupled together via a network 114. The first migration device 108 includes a first virtual storage device 110, created during configuration of the first migration device 108. Virtual storage devices are software emulations of storage devices. Here, the first virtual storage device 110 runs on the first migration device 108.

The first migration device 108 is configured to migrate data between devices, here, between the source storage device 102 and the target storage device 104. Migrating data includes pre-copy processing, copying the data, and post-copy processing. Preferably, the first migration device 108 copies the data by reading the data from the source storage device 102 and writing the data to the target storage device 104. In at least one embodiment, migrating the data also includes deleting the data from the source storage device as part of post-copy processing. The host 106 is typically a computer configured to manipulate the data, and requests the data via read and write access requests. The first virtual storage device 110 is configured to receive the write access requests during migration of the data and send the write access requests to the source storage device 102 and the target storage device 104. The first virtual storage device 110 is also configured to receive the read access requests during migration of the data and send the read access requests to the source storage device 102.

Figure 1B:
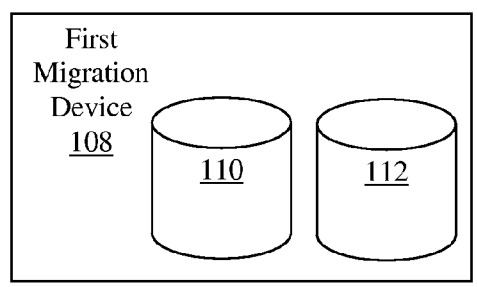
FIG. 1B illustrates a migration device in accordance with at least some illustrative embodiments.

The first migration device 108 further includes an alternate virtual storage device 112 as illustrated in the embodiment of FIG. 1B. The alternate virtual storage device 112 is preferably created when there are multiple data access paths to the source storage device 102 from the first migration device 108. The alternate virtual storage device 112 is preferably used to provide data path redundancy and load balancing both to the host input/output requests as well as for the migrations from the first migration device 108. The first virtual storage device 110 is configured to fail over to the alternate virtual storage device 112 upon an error, e.g., a migration error, read error, write error, etc. Upon such an error, the data already migrated need not be migrated again. Rather, the alternate virtual storage device 112 will assume the responsibilities of the first virtual storage device 110 and continue the migration from the point of error.

The first migration device 108 is configured to be coupled and decoupled from the source storage device 102, the target storage device 104, and/or the network 114 without disrupting network communication. Preferably, the first migration device 108 is coupled to the network 114 in order to migrate data, and once migration is complete, the first migration device 108 is decoupled from the network 114. Such coupling and decoupling preferably takes the form of a physical attachment and detachment. After copying, the host 106 may be configured to access the data on the target storage device 104, and the data on the source storage device 102 may be deleted if desired. Contrastingly, if desired, the host 106 may continue to access the data on the source storage device 102, and any write requests will also be sent to the target storage device 104 to maintain data consistency. Such a scenario may occur when the target storage device 104 is used as a backup of the source storage device 102. After consistency is verified, a full copy snapshot of the target storage device may be presented to another host. As such, the original host is decoupled from the target storage device and continues to write to the source storage device.

In at least one embodiment, the source storage device 102 and the target storage device 104 use Fibre Channel Protocol ("FCP"). FCP is a transport protocol that predominantly transports Small Computer System Interface ("SCSI") protocol commands over Fibre Channel networks.

In order to access data on the source storage device 102, the host 106 sends access requests to the source storage device 102. Access requests include read access requests and write access requests if the data is to be read or written to, respectively. Access to the data by the host 106 should not be interrupted during migration of the data; thus, the source storage device 102 is disassociated from the host 106 such that the host 106 sends the access requests for the data to the first virtual storage device 110 instead. Consider an example where the source storage device 102, the target storage device 104, and the host 106 communicate using FCP, the first migration device is 108 is a Fibre Channel switch, and the system 100 is a Fibre Channel fabric. Accordingly, the source storage device 102 is removed from a Fibre Channel zone that previously included the source storage device 102, the first migration device 108, and the host 106. Preferably, removing the source storage device 102 from the zone causes the host 106 to send the access requests for the data to the first virtual storage device 110, which remains a member of the zone as part of the first migration device 108. As such, the host 106 preferably uses multipathing software that detects virtual storage devices. Considering another approach, the access requests may be intercepted during transmission from the host 106 to the source storage device 102. The requests may then be redirected by any fabric element such that the first migration device 108 or the first virtual storage device 110 receive the requests.

The first virtual storage device 110 is configured to acquire a "lock" on the data during migration. The lock is a permission setting that allows the first virtual storage device 110 exclusive control over the locked data absent the presence of another lock. As such, write commands initiated by the host ("host writes") do not corrupt the data during copying. The first virtual storage device 110 is further configured to receive write access requests for the data, hold the write access requests, and upon release of the lock, send the held write access requests to the source storage device 102 and the target storage device 104 without interrupting access to the data by the host 106. In order to make sure that the held write access requests do not expire and interrupt host access, any locks on the data, including the lock acquired by the first virtual storage device 110, may be released such that the held write access requests may be sent to the source storage device and target storage device. Because the migration is atomic, if any write access requests on a given range are received before migration begins, the write access requests will be performed first. If the write access requests are received after the migration begins, the write access requests will be held to be performed once the migration ends. Preferably, the speed of copying the data allow for no interruption in access to the data by the host 106 should the host 106 request the data at the precise time of migration. However, should the request be in danger of expiring, e.g. timing out, the ability to cancel the lock is preferably invoked such that migration and host access are unaffected. Locking the data and holding the write access requests ensures that the data on the source storage device 102 is consistent with the data on the target storage device 104 during and after the migration. If no host requires access to the data, e.g. all hosts are disabled during the migration, the first migration device 108 does not lock the data, and performs a fast copy, allowing the migration of several terabytes of data per hour across multiple target storage devices 104.

Preferably, the data is not subject to a second lock (usually acquired by a host) upon acquisition of the lock (acquired by the first migration device). Performing a check for a second lock ensures that any write access requests submitted before a migration command is submitted are fully performed before the migration.

Considering a different approach, in order to minimize possible conflicts, the first virtual storage device 110 is configured to acquire a lock on only a portion of the data during migration of the portion. A portion of the data includes some, but not all, of the data to be migrated. Also, the portion size is adjustable. Acquiring a lock on only a portion of the data to be migrated, and only during the copying of the portion, allows the remainder of the data to be accessed by the host 106 during the copying of the portion, decreasing the likelihood that the host 106 should request access to the portion at the precise time the portion is being copied. As such, the first virtual storage device 110 is further configured to send write access requests received by the first virtual storage device 110, for data not subject to the lock, to the source storage device 102 and the target storage device 104. Preferably, the first virtual storage device 110 is configured to select the portion such that access to the data by the host 106 is not interrupted.

Similar to the previously discussed approach, the portion of data to be migrated is not subject to a second lock upon acquisition of the lock. Performing a check for a second lock ensures that any write access requests submitted before a migration command is submitted are fully performed before the migration. Also similar to the previously discussed approach, the first virtual storage device 110 is further configured to hold write access requests received by the first virtual storage device 110 for the portion, and upon release of the lock, send the held write access requests to the source storage device 102 and the target storage device 104 without interrupting access to the data by the host 106 in order to maintain consistent data between the two devices during and after the migration of the portion.

As an example, the size of the portion may be equal to two megabytes. Accordingly, after one two-megabyte portion of all the data to be migrated is locked and copied, another two-megabyte portion of the data is locked and copied. The size restriction is adjustable, and should be adjusted such that no interruption of the access to the data is experienced by the host 106. For example, the size restriction may be adjusted to one megabyte. As such, the write access request to a portion being migrated would take less time to complete than if the size restriction was two megabytes because the migration of one megabyte takes less time than the migration of two megabytes. However, the latency of the write access requests is minimal even considering the possibility of a write access request occurring concurrently with migration of the portion. Even so, should the request be in danger of expiring, e.g. timing out, the ability to cancel the lock is preferably invoked such that the held write access requests may be sent to the source storage device and target storage device and such that migration and host access are unaffected.

In yet a different approach, the system 100 includes a second migration device 114 coupled to the source storage device 102 and the target storage device 104. In at least one embodiment, the second migration device 114 is a switch. Similar to the above, the second migration device 114 includes a second virtual storage device 116, and the second virtual storage device 116 is configured to receive access requests for the data from the host 106 during data migration. In this approach, the first virtual storage device 110 is configured to fail over to the second virtual storage device 116 upon an error, e.g., a migration error, read error, write error, hardware error, etc. The first migration device 108 and second migration device 114 are configured to be coupled and decoupled from the source storage device 102 and the target storage device 104 without interrupting access to the data by the host 106. In at least one embodiment, the second migration device is 114 a Fibre Channel switch.

Despite only the first migration device 108 performing the migration in this approach, absent an error, both the second virtual storage device 116 and the first virtual storage device 110 are configured to send the write access requests to the source storage device 102 and the target storage device 104.

Considering another approach, the second migration device 114 is configured to migrate the data from the source storage device 102 to the target storage device 104 in conjunction with the first migration device 108. When both migration devices 108, 114 perform the migration, both migration devices 108, 114 read from the source storage device 102 and write to the target storage device 104. As previously discussed, the migration of data may occur as a whole, or the migration may be divided into two or more portions, each migration device responsible for migrating different portions.

Accordingly, each virtual storage device 110, 116 is configured to acquire a lock on the portion of the data it migrates so that each virtual storage device 110, 116 may receive and hold write access requests from the host 106 for its portion. Specifically, the first virtual storage device 110 is configured to acquire a lock on a first portion of the data during copying such that the first virtual storage device 110 is capable of receiving and holding write access requests for the first portion, the first portion being migrated by the first migration device 108. Also, the second virtual storage device 116 is configured to acquire a lock on a second portion of the data during copying such that the second virtual storage device 116 is capable of receiving and holding the write access requests for the second portion, the second portion being migrated by the second migration device 114. The first virtual storage device 110 is configured to send the write access requests for the first portion to both the source storage device 102 and the target storage device 104 upon release of the corresponding lock. Similarly, the second virtual storage device 116 is configured to send the write access requests for the second portion to both the source storage device 102 and the target storage device 104 upon release of the corresponding lock.

Preferably, such actions are performed without interrupting access to the data by the host 106. Similar to the previously described approaches, the first portion and the second portion are preferably not subject to a host lock upon acquisition of the migration locks. Performing a check for a host lock ensures that any write access requests submitted before a migration command is submitted are fully performed before the migration. The size of the first portion, as an example, is equal to two megabytes and the size of the second portion is equal to two megabytes. Such size restriction is adjustable, and should be adjusted such that no interruption of the access to the data is experienced by the host 106. Even so, should the request be in danger of expiring, e.g. timing out, the ability to cancel the lock is preferably invoked such that the held write access requests may be sent to the source storage device and target storage device and such that migration and host access are unaffected.

Considering another approach, the system 100 further includes multiple source storage devices 102. The multiple source storage devices 102 can include greater than one hundred source storage devices 102. Additionally, the first migration device 108 includes a first set of virtual storage devices 110 corresponding to the multiple source storage devices 102, and the second migration device 114 includes a second set of virtual storage devices 116 corresponding to the multiple source storage devices 102. Preferably, the ratio between the number of the first set of virtual storage devices 110 and the multiple source storage devices 102 is one-to-one. Similarly, the ratio between the number of the second set of virtual storage devices 116 and the multiple source storage devices 102 is one-to-one.

Each virtual storage device 110, 116 includes a parent volume representing an entire source storage device. While migration of the entire source storage device is possible, the parent volume can be broken into multiple subvolumes, one for each portion of the source storage device that is to be migrated as well.

Considering another approach, the first migration device 108 includes a first set of virtual storage devices 110, each virtual storage device out of the first set of virtual storage devices 110 corresponding to a data path between the first migration device 108 and the multiple source storage devices 102. The second migration device 114 includes a second set of virtual storage devices 116, each virtual storage device out of the second set of virtual storage devices 116 corresponding to a data path between the second migration device 114 and the multiple source storage devices 102. Each data path between the first migration device 108, or second migration device 114, and the multiple source storage devices 102 is represented by a port on the one of the multiple source storage devices 102 in combination with a logical unit number. Thus, data paths are not merely physical links between the migration devices 108, 114 and the source storage devices 102 but virtual routes taken by communication between migration devices 108, 114 and source storage devices 102. As such, each physical link includes more than one data path. Also, the host 106 is configured to access the data during the migration without host configuration changes.

As those having ordinary skill in the art will appreciate, the above described approaches can be used in any number of combinations, and all such combinations are within the scope of this disclosure.

Figure 2:
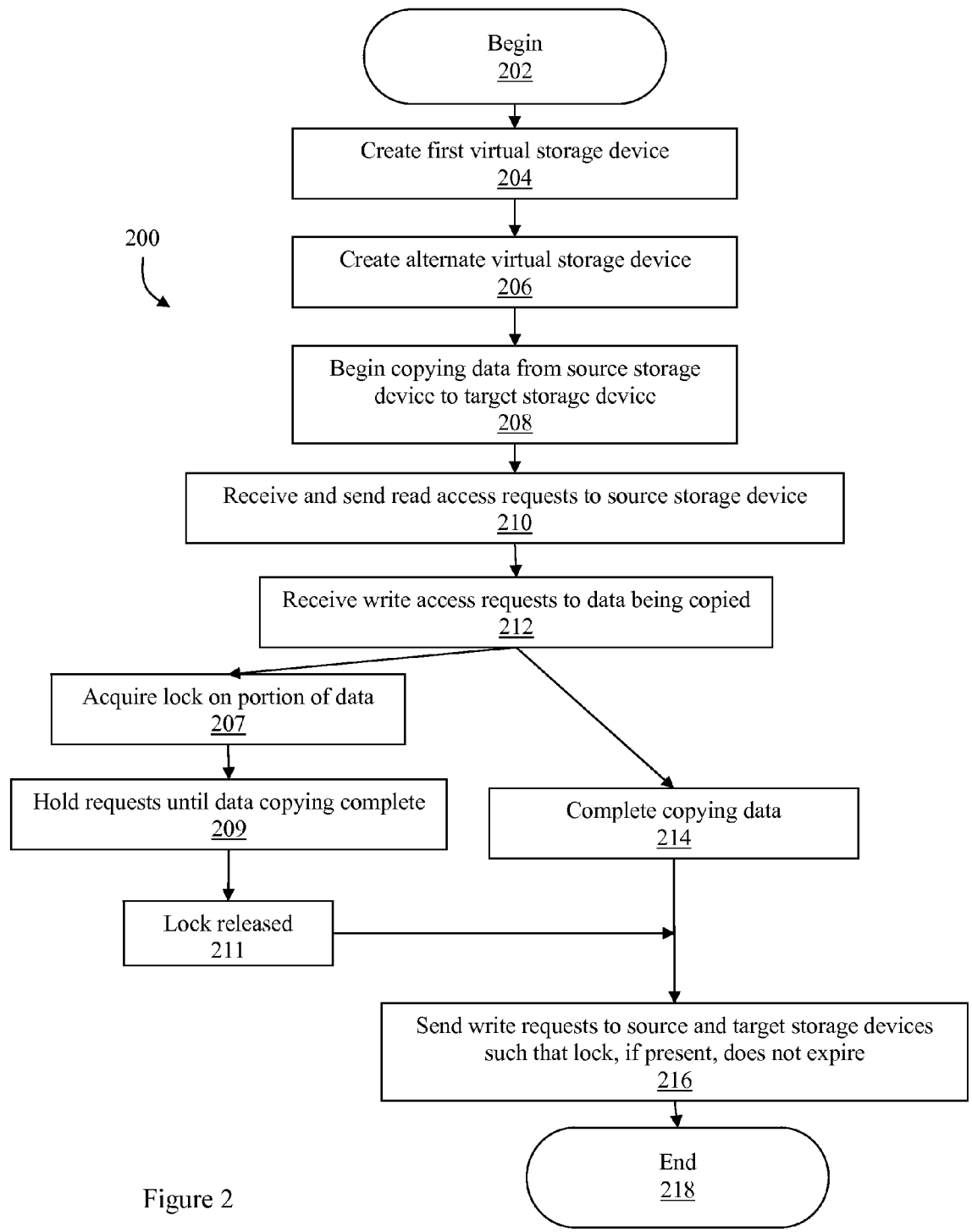
FIG. 2 illustrates a method for migrating data in accordance with at least some illustrative embodiments.

FIG. 2 illustrates a method 200 for data migration from a source storage device to a target storage device, beginning at 202 and ending at 218. In at least one embodiment, some of the steps are performed concurrently or simultaneously. At 204, a first virtual storage device is created. The first virtual storage device is configured to receive write access requests for data from a host during migration of the data and send the write access requests to the source storage device and the target storage device. At 206, an alternate storage device is created. The alternate virtual storage device is configured to receive write access requests for data from a host during migration of the data and send the write access requests to the source storage device and the target storage device. The first virtual storage device is configured to fail over to the alternate virtual storage device upon an error, e.g., a migration error, read error, write error, etc. At 208, the data is copied from the source storage device to the target storage device using the first virtual storage device. During the copying at 210, read access requests received at the first virtual storage device from the host are preferably sent to the source storage device. At 212, during the copying, write access requests for the data are received at the first virtual storage device from the host. These write access requests are ultimately sent from the first virtual storage device to the source storage device and the target storage device. In at least one embodiment, at 209 the write access requests are held during copying of the data because a lock is acquired on the data (207). After the data copy has ended at 209, the lock is released (211), and the held write access requests are sent to the source storage device and the target storage device at 216. Preferably, the write access requests are sent before they expire, e.g. time out, and the lock is released as necessary.

Preferably, the source storage device is disassociated from the host such that the host sends the access requests for the data to the first virtual storage device. For example, a Fibre Channel fabric includes the source storage device, the target storage device, and the host. As such, migrating the data further includes removing the source storage device from a Fibre Channel zone such that the host sends the access requests for the data to the first virtual storage device, the host being a member of the Fibre Channel zone. In at least one embodiment, the above steps apply to portions of the data, and the size of the portion is configurable, e.g., the size of the portion may be equal to two megabytes or one megabyte.

Considering a different approach, a second virtual storage device is created. Similar to the above approaches, the second virtual storage device can be used as a fail over or in conjunction with the first virtual storage device. Should an error occur on the path between the host and a first virtual storage device, a fail over path is chosen. The fail over path is either the path between the host and the alternate virtual storage device (on the same migration device) or the path between the host and the second virtual storage device (on a different migration device). If the first virtual storage device encounters a software error, the alternate virtual storage device is preferably chosen. If the first migration device encounters a hardware error or the data path to the first virtual storage device is in error, the data path to the alternate virtual storage device is probably in error as well, and the second virtual storage device is preferably chosen. Should an error occur on the path between the first virtual storage device and the source storage device, another fail over path may be similarly chosen, or if the data requested has already been migrated, the first virtual storage device may access the data on the target storage device.

Should an error occur on the path between the first virtual storage device and the target storage device, another path may be similarly chosen. However, in such a case, if a write access request has been successfully performed by the source storage device (but not the target storage device due to the error), a successful write acknowledgment may still be returned to the host because a new migration, from the source storage device to the target storage device, of the relevant portion of the data is initialized either on a different path or the same path at a later time, preferably when the path is healthy again.

Preferably, when the first virtual storage device fails over to the second virtual storage device on a different migration device, the migration status is synchronized via messages from the first migration device to the second migration device. In case of a failed portion of migration, the second migration device preferably attempts the migration as well. Should the first migration device suffer hardware failure, the second migration device preferably verifies the failure before assuming migration responsibilities. Such verification can be made using "keys" on the target storage device. A key is a particular sequence of data written to the target storage device. When both migration devices are functioning normally, they will write the same key onto the target storage device when accessing the target storage device. In order for the second migration device to verify failure of the first migration device, the second migration device uses an alternate key instead of the original key. If the first migration device has not failed, it will overwrite this alternate key with the original key upon accessing the target storage device. Upon recognizing the failure to overwrite, the second migration device can safely assume that the first migration device has indeed failed, and may take migration responsibility. Such a key system can be implemented using Small Computer System Interface ("SCSI") protocol.

Figure 3:
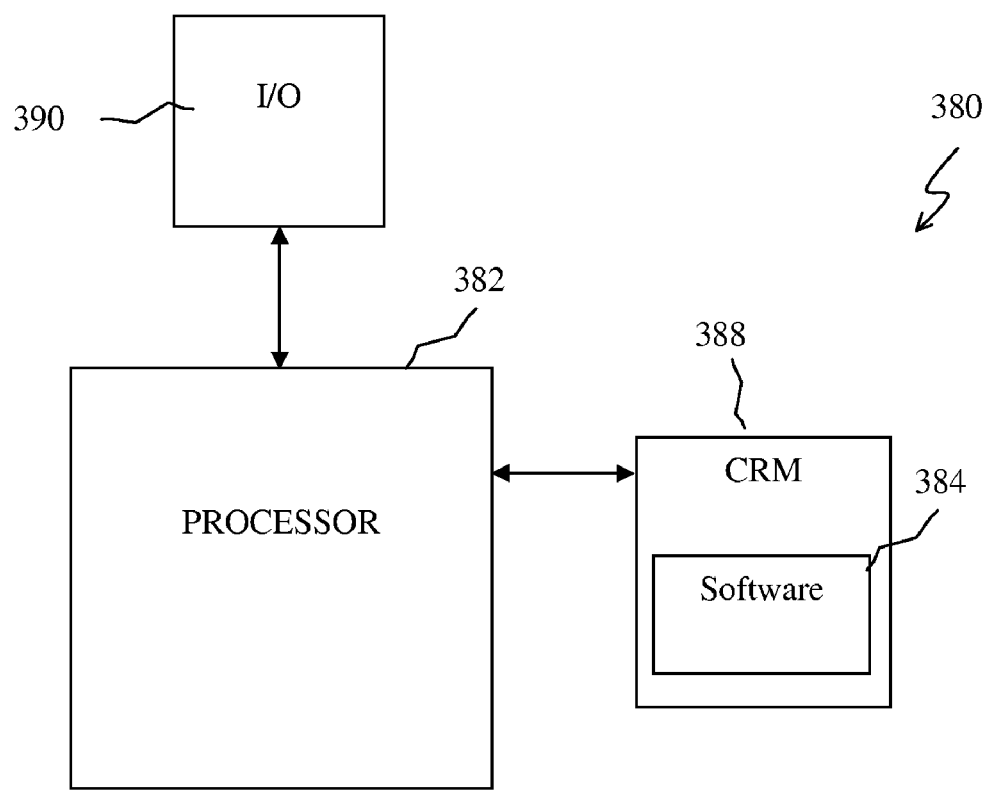
FIG. 3 illustrates a general-purpose computer suitable for implementing one or more embodiments described herein.

Preferably, an audio or visual alert is triggered upon successful migration of the data or upon an error. Additionally, audio or visual alerts may be triggered upon successful completion of any action described herein, upon unsuccessful actions described herein, and upon errors. The system described above may be implemented on any general-purpose computer with sufficient processing power, memory resources, and throughput capability to handle the necessary workload placed upon the computer. FIG. 3 illustrates a typical, general-purpose computer system 380 suitable for implementing one or more embodiments disclosed herein. The computer system 380 includes a processor 382 (which may be referred to as a central processor unit or CPU) that is in communication with memory devices including storage 388, and input/output (I/O) 390 devices. The processor 382 may be implemented as one or more CPU chips. In at least one embodiment, the processor 382 is located on a switch. Preferably, the switch is a Fibre Channel switch.

The storage 388 comprises a computer-readable medium such as volatile memory (e.g., RAM), non-volatile storage (e.g., Flash memory, hard disk drive, CD ROM, etc.), or combinations thereof. The storage 388 comprises software 984 that is executed by the processor 382. One or more of the actions described herein are performed by the processor 382 during execution of the software 384.

The above disclosure is meant to be illustrative of the principles and various embodiment of the present invention. Numerous variations and modifications will become apparent to those skilled in the art once the above disclosure is fully appreciated. Also, the order of the actions shown in FIG. 2 can be varied from order shown, and two or more of the actions may be performed concurrently. It is intended that the following claims be interpreted to embrace all variations and modifications.

We claim:

1. A method of migrating data, comprising:
creating a first virtual storage device configured to be used in copying the data from a source storage device to a target storage device;
receiving write access requests for the data at the first virtual storage device from a host during migration of the data;
sending the write access requests from the first virtual storage device to the source storage device and the target storage device;
acquiring a lock on a portion of the data during copy of the portion;
sending received write access requests, for data not subject to the lock, to the source storage device and the target storage device;
holding received write access requests for the portion; and
sending the held write access requests to the source storage device and the target storage device upon release of the lock such that the held write access requests do not expire.

2. The method of claim 1, further comprising creating an alternate virtual storage device, the first virtual storage device configured to fail over to the alternate virtual storage device upon an error.

3. The method of claim 1, further comprising disassociating the source storage device from the host such that the host sends read and write access requests for the data to the first virtual storage device.

4. The method of claim 1, further comprising:
creating a second virtual storage device configured to receive read and write access requests for the data from the host during migration of the data.

5. The method of claim 4, wherein the first virtual storage device is configured to fail over to the second virtual storage device upon an error.

6. The method of claim 4, wherein copying the data comprises copying the data from a source storage device to a target storage device using the first virtual storage device and second virtual storage device.

7. The method of claim 6, further comprising disassociating the source storage device from the host such that the host sends the read and write access requests for the data to either the first virtual storage device or the second virtual storage device.

8. The method of claim 6, wherein creating the first virtual storage device comprises creating a plurality of virtual storage devices corresponding to a plurality of source storage devices, and wherein creating the second virtual storage device comprises creating a second plurality of virtual storage devices corresponding to the plurality of source storage devices.

9. The method of claim 6, wherein creating a first virtual storage device comprises creating a plurality of virtual storage devices, each virtual storage device out of the plurality of virtual storage devices corresponding to a data path associated with one of a plurality of source storage devices, and wherein creating a second virtual storage device comprises creating a second plurality of virtual storage devices, each virtual storage device out of the second plurality of virtual storage devices corresponding to a data path associated with one of the plurality of source storage devices.

10. The method of claim 1, further comprising intercepting access requests from the host and redirecting the access requests to the first virtual storage device.

11. The method of claim 1, wherein creating the first virtual storage device comprises creating the first virtual storage device on a switch, the first virtual storage device configured to receive write access requests for data from the host during migration of the data and configured to send the write access requests to the source storage device and the target storage device.

12. A device, comprising:
a first virtual storage device;
and an alternate virtual storage device, the first virtual storage device configured to fail over to the alternate virtual storage device upon a migration error, read error, or write error,
wherein the device is configured to migrate data from a source storage device to a target storage device;
wherein the first virtual storage device is configured to receive write access requests for the data from the host during data migration and send the write access requests to the source storage device and the target storage device;
acquire a lock on a portion of the data during copy of the portion;
send write access requests received by the first virtual storage device, for data not subject to the lock, to the source storage device and the target storage device;
hold write access requests received by the first virtual storage device for the portion; and
send the held write access requests to the source storage device and the target storage device upon release of the lock such that the held write access requests do not expire.

13. The device of claim 12, wherein the access requests from the host are intercepted and redirected to the first virtual storage device.

14. The device of claim 12, wherein the device is a switch.

15. A computer-readable medium storing a software program for migrating data that, when executed by a processor, causes the processor to:

create a first virtual storage device;
copy the data from a source storage device to a target storage device using the first virtual storage device;
receive write access requests for the data at the first virtual storage device from a host during migration of the data;
send the write access requests from the first virtual storage device to the source storage device and the target storage device;
acquire a lock on a portion of the data during copy of the portion;
send received write access requests, for data not subject to the lock, to the source storage device and the target storage device;
hold received write access requests for the portion; and
sending the held write access requests to the source storage device and the target storage device upon release of the lock such that the held write access requests do not expire.

16. The computer-readable medium of claim 15, wherein the access requests from the host are intercepted and redirected to the first virtual storage device.

17. The computer-readable medium of claim 15, wherein the processor is located on a switch.

* * * * *